United States Patent [19]

Henning

[11] Patent Number: 5,213,444
[45] Date of Patent: May 25, 1993

[54] OIL/GAS COLLECTOR/SEPARATOR FOR UNDERWATER OIL LEAKS

[75] Inventor: Carl D. Henning, Livermore, Calif.

[73] Assignee: The United States of America as represented by the United States Department of Energy, Washington, D.C.

[21] Appl. No.: 870,067

[22] Filed: Apr. 17, 1992

[51] Int. Cl.⁵ ............................................. E02B 15/04
[52] U.S. Cl. ...................................... 405/63; 405/62; 405/60
[58] Field of Search ..................... 405/60, 62, 63, 65

[56] References Cited

U.S. PATENT DOCUMENTS

| | | | |
|---|---|---|---|
| 4,449,850 | 5/1984 | Cessou et al. | 405/60 |
| 4,531,860 | 7/1985 | Barnett | 405/60 |
| 4,643,612 | 2/1987 | Bergeron | 405/60 |
| 4,960,347 | 10/1990 | Strange | 405/60 X |
| 5,035,536 | 7/1991 | von Winckelmann | 405/60 |

Primary Examiner—Dennis L. Taylor
Assistant Examiner—J. Russell McBee
Attorney, Agent, or Firm—Henry P. Sartorio; Roger S. Gaither; William R. Moser

[57] ABSTRACT

An oil/gas collector/separator for recovery of oil leaking, for example, from an offshore or underwater oil well. The separator is floated over the point of the leak and tethered in place so as to receive oil/gas floating, or forced under pressure, toward the water surface from either a broken or leaking oil well casing, line, or sunken ship. The separator is provided with a downwardly extending skirt to contain the oil/gas which floats or is forced upward into a dome wherein the gas is separated from the oil/water, with the gas being flared (burned) at the top of the dome, and the oil is separated from water and pumped to a point of use. Since the density of oil is less than that of water it can be easily separated from any water entering the dome.

21 Claims, 2 Drawing Sheets

OIL/GAS COLLECTOR/SEPARATOR FOR UNDERWATER OIL LEAKS

The United States Government has rights in this invention pursuant to Contract No. W-7405-ENG-48 between the United States Department of Energy and the University of California for the operation of the Lawrence Livermore National Laboratory.

BACKGROUND OF THE INVENTION

The present invention relates to an apparatus for collecting and separating oil/gas leaking from an offshore or underwater oil well or underwater oil transporting system. In particular, the invention relates to an oil/gas collector/separator floated over the point of leakage which collects the leaking oil/gas and then separates the gas from the oil.

Contamination of the environment by leakage of oil and/or oil/gas from underwater pipelines and/or oil wells has become a serious problem. Costs to remove oil coming to the surface via leakage from an underwater well or pipeline are tremendous. In addition, the loss of the oil can be in hundreds or thousands of barrels a day, which is a significant loss of a vital natural resource.

The primary efforts expended for oil leakage of the above-mentioned type have been directed to removal of the oil from the surface of the water and decontamination of wildlife and surrounding land as the result of the oil leakage. However, to additionally prevent or reduce the loss of a vital natural resource, oil recovery apparatus can be effective in preventing the contamination caused by oil and oil/gas leakage from underwater pipelines or oil wells. For example, a large number of oil wells are located offshore in deep water and rupture of a well casing, etc., causes the oil/gas to be discharged upwardly under pressure from the oil well, resulting in a loss of oil.

There therefore exists an urgent need for a more rapid and cost effective way to collect and/or recover oil and/or oil/gas discharged from underwater oil wells or oil pipelines.

SUMMARY OF THE INVENTION

It is an object of the present invention to provide an apparatus for collecting and removing fluid discharged underwater.

It is a further object of the present invention to provide an apparatus for collecting and removing oil from water.

It is a further object of the present invention to provide an apparatus for collecting and separating oil/gas caused by an underwater leakage from an oil well or pipeline.

It is another object of the present invention to provide an apparatus for removing at least oil leaked underwater from an oil well or oil pipeline.

It is another object of the present invention for separating oil/gas leaked or discharged from an underwater water source.

These and other objects of the invention are realized by providing a floating oil/gas collector/separator secured over the point of leakage of oil/gas from a source, such as an underwater oil well or pipeline system, which functions to collect and separate existing gas-/oil/water moving upwardly toward the water surface. Basically, the apparatus includes a hollow dome section secured to a flotation section to which is attached a downwardly extending skirt section, and means for removing oil and gas from the dome section after separation thereof within the dome section. The apparatus includes a plurality of tethers to maintain it in a location over the source of oil/gas leakage, such that upwardly moving oil and/or oil/gas from a source is collected or retained by the skirt section, separated within the dome section, with the gas being flared (burned) and the oil removed by pumps to a point of storage or use. The apparatus requires no mechanism within the dome to provide separation of water/oil/gas therein due to the relative densities thereof. It is well known that oil will float above the water and any gas will rise above the oil in the dome. The gas is removed from an upper portion of the dome by flaring or burning mechanisms well known in the art, and the oil is removed by a pumping system located so that the inlet is positioned above the water level within the dome.

DETAILED DESCRIPTION OF THE INVENTION

One of the most important features of this invention is that it provides a means for recovering oil which discharged from an underwater source, such as an offshore oil well. Thus, the invention functions to recover oil which would otherwise adversely affect the environment, while preventing loss of a scarce natural resource.

Oil well casings, etc. located offshore or underwater undergo tremendous pressures from earth movement as well as being subjected to corrosive effects, which result in leakage if not total breakage thereof, thus discharging oil/gas into the water. Oil and/or oil/gas leaked or discharged under pressure from an underwater source, such as an oil well or pipeline system moves upwardly toward the surface of the water due to relative densities, etc. of the water/oil/gas. As well known, a quantity of gas is generally released along with oil from an oil well, thus producing a danger from the safety and environment standpoint. Accordingly, there is a great need to enable the recovery of the discharging oil while eliminating danger produced by gasses discharging with the oil. The present invention provides a relatively simple but cost effective apparatus for fulfilling this need. The apparatus of this invention basically involves a dome or tank mounted on a float and tethered over a leak, and provided with a downwardly extending skirt to provide for collecting/retaining the oil/gas as it moves upwardly toward the surface of the water, such that within the dome the gas/oil/water is separated, and the gas and oil removed therefrom.

Figure 1:
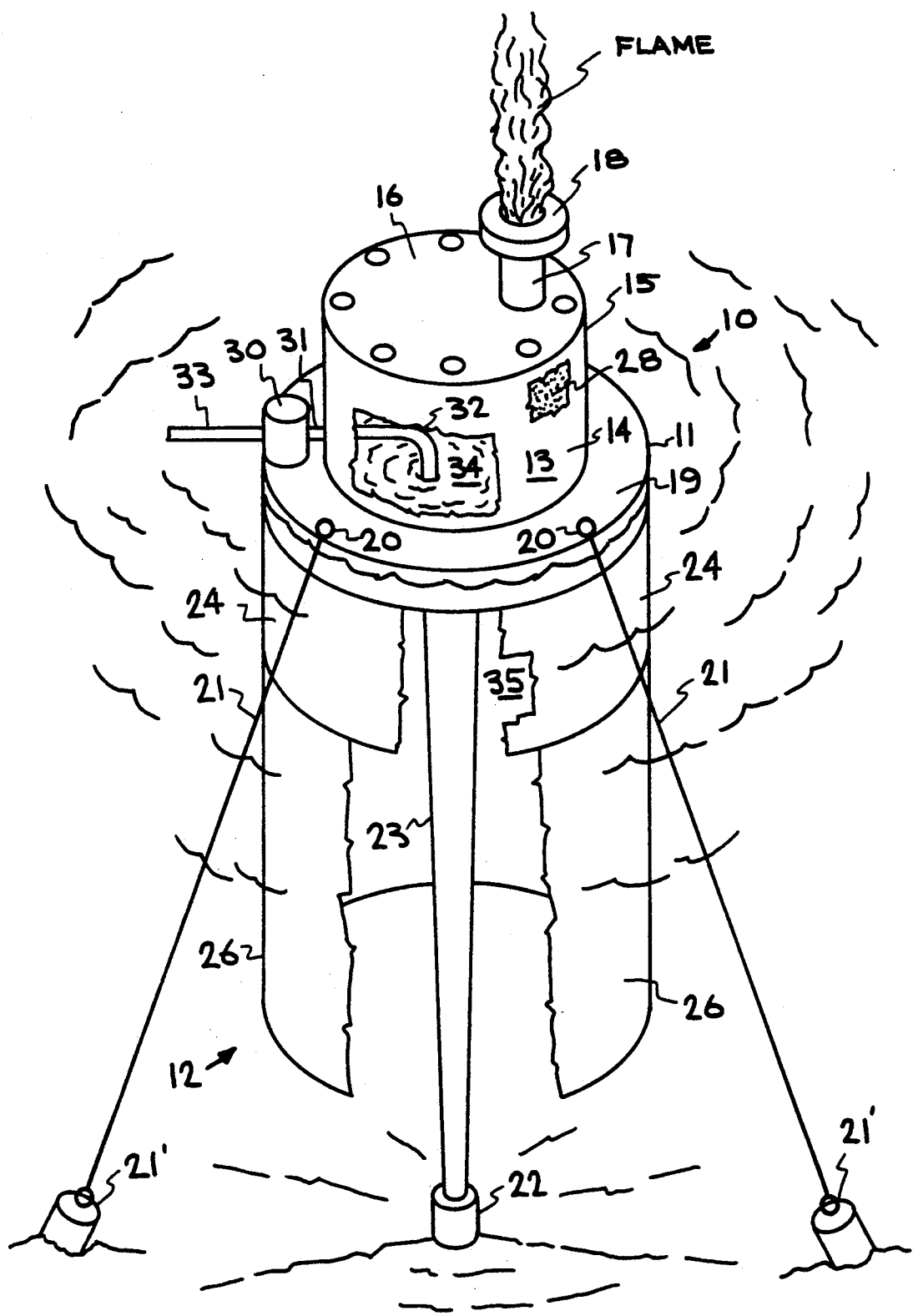
FIG. 1 is a perspective view of the apparatus of the present invention floating and tethered above a source of underwater oil, with sections thereof cut-away to illustrate the interior of the apparatus.

Referring now to the drawings, FIG. 1 illustrates the separator apparatus of this invention floating and tethered above an oil well located beneath the water surface and discharging oil/gas therefrom. Basically the apparatus comprises a hollow dome or tank section or assembly 10 secured to a float section or assembly 11 having a skirt section or assembly generally indicated at 12 secured to and extending downwardly beneath the float section 11.

Figure 2:
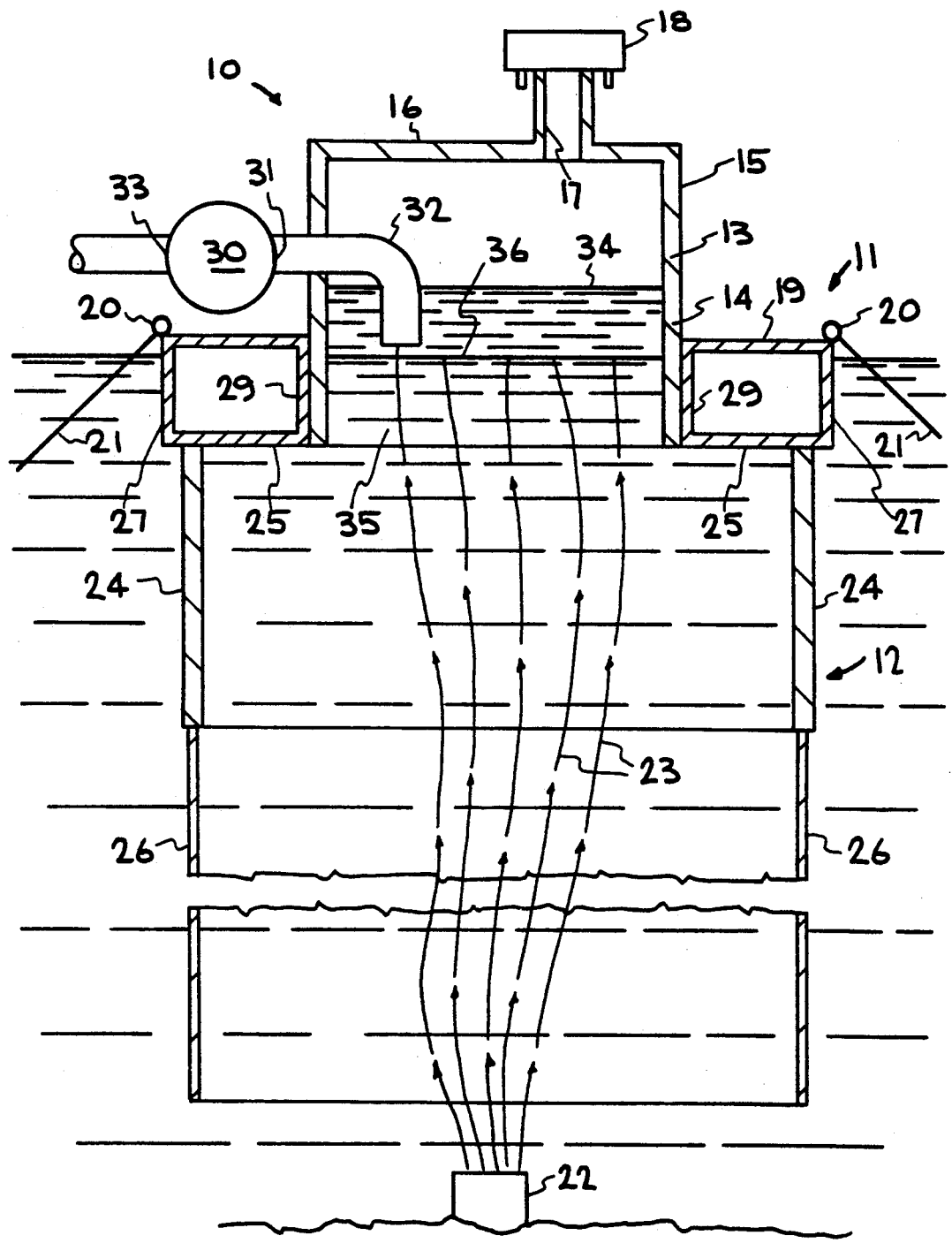
FIG. 2 is a cross-sectional view of an embodiment of the apparatus of FIG. 1 positioned above the end of an underwater oil well casing, with portions thereof illustrated schematically.

The dome or tank section 10 includes a body or sidewall 13 which is open at its lower end 14, and closed at its upper end 15 by a cap or top 16 having an opening or vent 17 therein. While the top 16 is illustrated in FIG. 2 as being integral with the sidewall or body 13 it may be removably secured thereto as illustrated in FIG. 1. The vent or opening 17 is provided with or connected to a burner mechanism or assembly generally indicated at 18, such that gas discharged from the upper end 15 of dome or tank section 10 is flared (as indicated by the legend "Flame" in FIG. 1) in accordance with the general practice for disposing of gas from oil wells.

The float section 11 basically comprises a donut shaped hollow member provided at an upper surface 19 with a plurality of tethering connectors 20 spaced thereabout, each connector 20 being secured to a tethering line 21 which in turn is secured to an anchor mechanism 21'. The apparatus of this invention is thus maintained at a desired location above an oil wellhead or well casing 22 from which is discharging a flow of oil, indicated at 23, which moves upwardly and into the lower end 14 of the dome or tank section 10.

The skirt section 12 functions to reduce or prevent waves, for example, from changing the upward movement of the leaking oil/gas and comprises a fixed or ridged or substantially non-flexible skirt 24 secured at one edge to a lower surface 25 of float section 11, such as by welding or clamp mechanisms, and secured at the opposite end to a flexible skirt 26 such as by clamping or welding. By way of example the width or downward distance of skirt 24 may be 5–10 feet while the width or downward distance of skirt 26 may be from 10–50 feet, thus an overall depth of the skirt section 12 may extend 60 feet, for example, beneath the lower surface 25 of float section 11. The flexible skirt 26 may, for example, be constructed such that it can be rolled or released in connected segments to various depths or distances. The skirt 24 may be constructed of materials such as steel, aluminum, or plastic with a thickness of 0.1 to 1 inches, while the flexible skirt 26 may be constructed of materials such as rubber, plastic, or thin metals with a thickness of 0.05 to 0.5 inches.

As seen in the drawings, an outer or side surface 27 of float section 11 has a larger diameter than that of dome or tank section 10, the diameters of these two sections depending on the height and weight of the dome or tank section 10. The diameter and height of the float section 11 must be sufficient to maintain the tank section 10 in an upright position, and to provide adequate water displacement so as to maintain the collector/separator apparatus in a floating condition. For example, with the dome or tank section 10 having a diameter of 30 feet, a height of 10 feet and a weight of about 10,000 pounds, the outer diameter of the floating section 11 would be 34 feet with the height of side surface 27 being 4 feet. The hollow member of floating section 11 may be constructed of material selected from steel or aluminum, with a wall thickness of ¼ to 1 inch while the tank or dome section 10 may be constructed of steel, aluminum or plastic composite, with a wall thickness of ¼ to 1 inch. Due to the heat generated by flaring the gas 28 (see FIG. 1) contained in the upper end 15 of the dome or tank section 10, the top or cap 16 and at least the adjacent portions of upper end 15 must be constructed of or covered or lined with a material capable of withstanding the heat thus generated. At least the lower end 14 of dome or tank section 10 must be constructed of, or covered or lined with, a material compatible with the oil/water therein to prevent corrosion.

As shown in FIG. 2, the lower end 14 of dome or tank section 10 extends into and is secured within an inner or side surface 29 of the hollow member comprising float section 11. However, dome or tank section 10 may be secured to upper surface 19 of float section 11. The material of float section 11 must be compatible with water/oil in which it is located. In such a case, the inner surface 28 of float section 11 must be constructed of or lined with a material compatible with the oil/water therein so as to prevent damage thereto.

A pump assembly 30 is mounted on upper surface 19 of float section 11 and includes an intake or inlet 31 connected to a pipe or line 32 extending through the sidewall wall 13 of dome or tank section, and an outlet or discharge 33 adapted to be connected to a barge via an appropriate line or piping arrangement not shown. The pipe or line 32 is constructed with a horizontal and a vertical section so as to extend into oil 34 contained within the lower end 14 of dome or tank section 10, but must terminate above an interface between the oil 34 and water 35, as indicated at 36, such that only oil is drawn by pump assembly 30 through line 32. The length and diameter of the line or pipe 32 and the size of pump assembly 29 will be determined by the volume of the oil/gas being forced upwardly into the lower end 14 of dome or tank section 10.

While the dome or tank section 10 has been illustrated as being cylindrical and the float and skirt sections 11 and 12 illustrated as being circular, these sections may be of a hexagonal, square or other configuration. Where the collector/separator apparatus is used for offshore applications, it will be subject to salt water as well as to mild or severe wave motions of the water, and thus the size, shape, and materials constructed from will be selected to withstand these environmental conditions. The collector/separator apparatus can be towed to a point of use and retained thereat by appropriate tethering/anchor mechanisms capable of withstanding waves, etc., so as to maintain the apparatus over the oil leak.

While the collector/separator apparatus has been illustrated and described above for use with a leaking oil well from which oil and some gas is leaking or flowing, the apparatus can be utilized to collect and separate oil discharging from an underwater pipe, line, sunken ship, etc. In such applications, there may not be a gas to dispose of by the apparatus.

It has thus been shown that the present invention provides a relative simply constructed, cost effective apparatus for the collection and separation of oil and oil/gas leaking from an underwater oil well or piping system. Many variations of the collector/separator apparatus of the present invention are possible. The full scope of the invention is intended only to be limited by the appended claims.

I claim:

1. An apparatus for collecting and separating at least oil leaked from an underwater source comprising:
   a tank section having an open lower end and a closed upper end, said closed upper end being provided with at least one opening therein;
   a float section to which said tank section is secured and provided with means by which said tank section is maintained above and over an associate underwater oil leak;

a skirt section secured to said float section and constructed so as to extend downwardly from said float section for allowing oil to flow upwardly into said lower open end of said tank section; and means for removing oil from said tank section.

2. The apparatus of claim 1, additionally including means for removing gas from said tank section.

3. The apparatus of claim 1, wherein said tank section is constructed in a cylindrical configuration, and wherein said float section and said skirt section are constructed in a circular configuration, with said float section having a central opening within which said open lower end of said tank section is secured.

4. The apparatus of claim 3, wherein said tank section is provided with a gas burner mechanism connected to said opening in said closed upper end thereof.

5. The apparatus of claim 1, wherein said skirt section comprises a substantially non-flexible portion secured to said float section, and a flexible portion extending downwardly from said non-flexible portion.

6. The apparatus of claim 1, wherein said means for removing oil from said tank section includes a pump assembly connected to receive oil contained within a lower end portion of said tank section and adapted to be connected to discharge oil to a point external to said apparatus.

7. The apparatus of claim 1, wherein said float section is constructed as a hollow member having a central opening therein, said open lower end of said tank section being connected to said central opening in said hollow member, said hollow member being provided with connector means operatively connected to said means for maintaining said tank section above and over an associated underwater oil leak.

8. The apparatus of claim 7, wherein said tank section is of a cylindrical configuration, and wherein said open lower end of said tank section is positioned within said central opening of said hollow member.

9. An apparatus adapted for collecting and separating oil/gas being discharged from an offshore oil well into surrounding water, said apparatus comprising:

a tank assembly for receiving oil/gas;

a float assembly for maintaining said tank assembly positioned so as to receive oil/gas from an associated offshore oil well;

a skirt assembly operatively connected to said float assembly for preventing oil/gas discharging from an associated offshore oil well from being forced away from said tank assembly;

means for removing oil from said tank assembly; and means for removing gas from said tank assembly.

10. The apparatus of claim 9, wherein said tank assembly includes a cylindrical shaped hollow tank open at a lower end and closed at an upper end, said closed end have a vent therein;

wherein said float assembly includes a hollow member with a central opening passing therethrough, said tank being mounted on said hollow member such that said open lower end of said tank is in open communication with said central opening in said hollow member.

11. The apparatus of claim 10, wherein said means for removing oil from said tank assembly includes a pump assembly having an inlet connected to a lower end section of said tank.

12. The apparatus of claim 10, wherein said means for removing gas from said tank assembly comprises a burner mechanism operatively connected to said vent in said upper end of said tank.

13. The apparatus of claim 10, wherein said skirt assembly comprises a pair of sections, an upper most skirt section being secured to said hollow member, and a lower most skirt section extending downwardly from said upper most skirt section.

14. The apparatus of claim 13, wherein said upper most skirt section is substantially non-flexible, and wherein said lower most skirt section is flexible.

15. The apparatus of claim 10, wherein said hollow member is provided with a plurality of spaced tethering means by which the apparatus is maintained such that said central opening of said hollow member is located directly above oil/gas passing upwardly from an associated offshore oil well.

16. An oil/gas collector/separator for underwater oil leaks comprising:

a cylindrical tank;

a hollow float member for supporting said tank in a substantially upright position;

a skirt assembly secured to said hollow float member and extending in a direction away from said float member opposite said tank;

means for removing oil from said tank; and means for removing gas from said tank.

17. The collector/separator of claim 16, wherein said cylindrical tank is provided with an open lower end and a closed upper end, said open lower end being secured to said hollow float member, said closed end being provided with at least one opening therein; and wherein said hollow float member is provided with a central opening therethrough, said open lower end of said tank being secured to said hollow float member so as to be in open communication with said central opening thereof.

18. The collector/separator of claim 16, wherein said means for removing gas from said tank includes a burner mechanism connected to said opening in said closed end of said tank.

19. The collector/separator of claim 16, wherein said skirt assembly includes a plurality of skirt sections, one of said plurality of skirt sections being substantially non-flexible, and another of said plurality of skirt sections being flexible, said one of said skirt sections being secured at one edge to an outer section of said hollow float member, said another of said skirt sections being secured at one edge to said one of said skirt sections.

20. The collector/separator of claim 16, wherein said means for removing oil from said tank includes a pump assembly supported on said hollow float member and including an inlet section and an outlet section, said inlet section of said pump assembly being connected to a pipe which extends into a lower section of said tank and adapted for withdrawing oil from said tank, and said outlet section of said pump assembly being adapted for connection to means for receiving oil from said tank.

21. The collector/separator of claim 16, wherein said hollow float member is provided with a plurality of connector means, said connector means being located in spaced relation about said hollow float member and adapted to be connected to means for retaining said float member such that least oil from an underwater leak passes upwardly through said skirt assembly and into said tank.

* * * * *